US008036185B2

(12) United States Patent
Malik

(10) Patent No.: US 8,036,185 B2
(45) Date of Patent: Oct. 11, 2011

(54) METHODS AND APPARATUS FOR A CONSOLIDATED SWITCH FOR USE WITH NETWORKED RF COMPONENTS

(75) Inventor: Ajay Malik, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1172 days.

(21) Appl. No.: 11/413,955

(22) Filed: Apr. 28, 2006

(65) Prior Publication Data

US 2007/0255820 A1   Nov. 1, 2007

(51) Int. Cl.
*H04W 4/00* (2009.01)
*G06F 15/173* (2006.01)
*G08B 13/14* (2006.01)
*G01B 5/28* (2006.01)

(52) U.S. Cl. ............... 370/338; 709/224; 340/572.1; 340/572.7; 702/40

(58) Field of Classification Search ............. 370/338; 709/224
See application file for complete search history.

(56) References Cited

U.S. PATENT DOCUMENTS

| | | | |
|---|---|---|---|
| 2003/0104848 A1 | 6/2003 | Brideglall | |
| 2004/0078151 A1* | 4/2004 | Aljadeff et al. | 702/40 |
| 2005/0030160 A1 | 2/2005 | Goren et al. | |
| 2005/0092825 A1* | 5/2005 | Cox et al. | 235/375 |
| 2005/0143133 A1 | 6/2005 | Bridgelall | |
| 2005/0200456 A1 | 9/2005 | Bridgelall | |
| 2007/0241906 A1* | 10/2007 | Malik | 340/572.7 |
| 2008/0266092 A1* | 10/2008 | Campero et al. | 340/572.1 |

FOREIGN PATENT DOCUMENTS

WO   WO2007/133851   11/2007

OTHER PUBLICATIONS

International Search Report and Written Opinion dated Aug. 10, 2007 in related case PCT/US2007/064765.
Preliminary Report on Patentability dated Nov. 6, 2008 in related case PCT/US2007/064765.

* cited by examiner

*Primary Examiner* — Rafael Pérez-Gutiérrez
*Assistant Examiner* — Timothy Pham

(57) ABSTRACT

A consolidated RF switch includes a cell controller configured to process data packets received from an access port communicatively coupled to a plurality of mobile units via a wireless network, and an RFID network controller configured to process tag information received from an RFID reader communicatively coupled to a plurality of RFID tags. The cell controller and the RFID network controller are configured to transmit the tag information and the data packets to one or more enterprise applications.

8 Claims, 4 Drawing Sheets

METHODS AND APPARATUS FOR A CONSOLIDATED SWITCH FOR USE WITH NETWORKED RF COMPONENTS

TECHNICAL FIELD

The present invention relates generally to radio frequency identification (RFID) systems, wireless local area networks (WLANs), and other RF components. More particularly, the invention relates to the management of, configuration of, and services provided by such systems.

BACKGROUND

Radio frequency identification (RFID) systems have achieved wide popularity in a number of applications, as they provide a cost-effective way to track the location of a large number of assets in real time. In large-scale application such as warehouses, retail spaces, and the like, many RFID tags may exist in the environment. Likewise, multiple RFID readers are typically distributed throughout the space in the form of entryway readers, conveyer-belt readers, mobile readers, etc.

At the same time, there has been a dramatic increase in demand for mobile connectivity solutions utilizing various wireless components and wireless local area networks (WLANs). This generally involves the use of wireless access points that communicate with mobile devices using one or more RF channels (e.g., in accordance with one or more of the IEEE 802.11 standards).

The number of mobile units and associated access ports, as well as the number of RFID readers and associated antennae, can be very large in an enterprise. As the number of components increases, the management and configuration of those components becomes complicated and time-consuming. This problem is exacerbated by the presence of handheld, wireless RFID readers and active RFID tags that communicate with access ports rather than standard RFID readers.

Accordingly, it is desirable to provide an efficient method of managing, configuring, and handling data from both RFID and WLAN systems. Furthermore, other desirable features and characteristics of the present invention will become apparent from the subsequent detailed description and the appended claims, taken in conjunction with the accompanying drawings and the foregoing technical field and background.

BRIEF SUMMARY

In accordance with the present invention, a centralized networking switching device efficiently controls the routing of RFID tag information, WLAN data, and data from any other type of RF element, and allows configuration and coordination of the various components of both systems. A consolidated RF switch in accordance with one embodiment, for example, includes a cell controller configured to process data packets received from an access port communicatively coupled to a plurality of mobile units via a wireless network, and an RFID network controller configured to process tag information received from an RFID reader communicatively coupled to a plurality of RFID tags. The cell controller and the RFID network controller are configured to transmit the tag information and the data packets to one or more enterprise applications. The RF switch thereby provides a seamless view of RF elements in the networks as well as services such as locationing, healing, and intrusion detection in any RF domain.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., radio-frequency (RF) devices, memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to signal processing, data transmission, signaling, network control, the 802.11 family of specifications, wireless networks, RFID systems and specifications, and other functional aspects of the system (and the individual operating components of the system) may not be described in detail herein. Furthermore, the connecting lines shown in the various figures contained herein are intended to represent example functional relationships and/or physical couplings between the various elements. Many alternative or additional functional relationships or physical connections may be present in a practical embodiment.

Without loss of generality, in the illustrated embodiment, many of the functions usually provided by a traditional access point (e.g., network management, wireless configuration, locationing of wireless devices, active 802.11 tags, etc.) and/or traditional RFID readers (e.g., data collection, RFID processing, etc.) are concentrated in a corresponding RF switch. It will be appreciated that the present invention is not so limited, and that the methods and systems described herein may be used in conjunction with traditional access points and RFID readers or any other device that communicates via RF channels.

The present invention relates to a centralized networking switching device that efficiently controls the routing of RFID data as well as WLAN data (e.g., 802.11 devices), and allows configuration and coordination of the various components of both systems.

Figure 1:
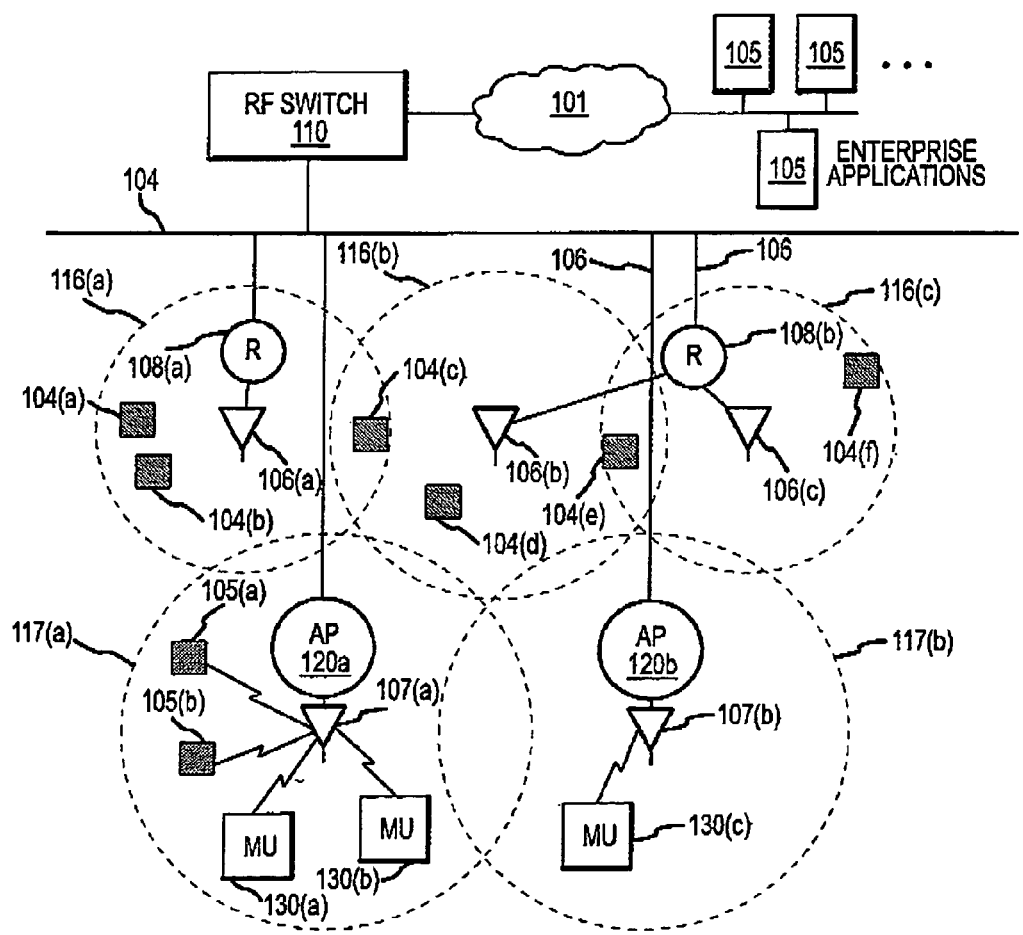
FIG. 1 is a conceptual overview of a system in accordance with an exemplary embodiment of the present invention.

Referring to FIG. 1, a switching device 110 (alternatively referred to as an "RF switch" or simply "switch") is coupled to a networks 101 and 104 (e.g., an Ethernet network coupled to one or more other networks or devices) which communicates with one or more enterprise applications 105. One or more wireless access ports 120 (alternatively referred to as "access ports" or "APs") are configured to wirelessly connect to one or more mobile units 130 (or "MUs"). APs 120 suitably communicate with switch 110 via appropriate communication lines 106 (e.g., conventional Ethernet lines, or the like). Any number of additional and/or intervening switches, routers, servers and other network components may also be present in the system.

A number of tags 104 are distributed throughout the environment. These tags are read by a number of RFID readers (or simply "readers") 108 having one or more associated antennas 106 provided within the environment. Tags 104 may also be read by APs 120 that read active tags, or by an ultra-wideband APS, or the like. That is, the term "tag" refers to any RF element that can be communicated with and which has an ID that can be read. Readers 108, like APs 120, may be stationary or mobile, and are suitably connective via wired or wireless data links to a RF switch 110.

A particular AP 120 may have a number of associated MUs 130. For example, in the illustrated topology, MUs 130(a) and 130(b) are associated with AP 120(a), while MU 130(c) is associated with AP 120(b). One or more APs 120 may be coupled to a single switch 110, as illustrated.

RF Switch 110 determines the destination of packets it receives over network 104 and 101 and routes those packets to the appropriate AP 120 if the destination is an MU 130 with which the AP is associated. Each WS 110 therefore maintains a routing list of MUs 130 and their associated APs 130. These lists are generated using a suitable packet handling process as is known in the art. Thus, each AP 120 acts primarily as a conduit, sending/receiving RF transmissions via MUs 130, and sending/receiving packets via a network protocol with WS 110. AP 120 is typically capable of communicating with one or more MUs 130 through multiple RF channels. This distribution of channels varies greatly by device, as well as country of operation. For example, in one U.S. embodiment (in accordance with 802.11(b)) there are fourteen overlapping, staggered channels, each centered 5 MHz apart in the RF band.

A particular RFID reader 108 may have multiple associated antennas 106. For example, as shown in FIG. 1, reader 108(a) is coupled to one antenna 106(a), and reader 108(b) is coupled to two antennas 106(b) and 106(c). Reader 108 may incorporate additional functionality, such as filtering, cyclic-redundancy checks (CRC), and tag writing, as is known in the art.

In general, RFID tags (sometimes referred to as "transponders") may be classified as either active or passive. Active tags are devices that incorporate some form of power source (e.g., batteries, capacitors, or the like), while passive tags are tags that are energized via an RF energy source received from a nearby antenna. While active tags are more powerful, and exhibit a greater range than passive tags, they also have a shorter lifetime and are significantly more expensive. Such tags are well known in the art, and need not be described in detail herein.

Each antenna 106 has an associated RF range (or "read point") 116, which depends upon, among other things, the strength of the respective antenna 106. The read point 116 corresponds to the area around the antenna in which a tag 104 may be read by that antenna, and may be defined by a variety of shapes, depending upon the nature of the antenna (i.e., the RF range need not be circular or spherical as illustrated in FIG. 1).

It is not uncommon for the RF ranges or read points to overlap in real-world applications (e.g., doorways, small rooms, etc.). Thus, as shown in FIG. 1, read point 116(a) overlaps with read point 116(b), which itself overlaps with read point 116(c). Accordingly, it is possible for a tag to exist within the range of two or more readers simultaneously. For example, tag 104(c) falls within read points 116(a) and 116(b), and tag 104(f) falls within read points 116(b) and 116(c). Because of this, two readers (108(a) and 108(b)) may sense the presence of (or other event associated with) tag 104(c).

As described in further detail below, switch 102 includes hardware, software, and/or firmware capable of carrying out the functions described herein. Thus, switch 102 may comprise one or more processors accompanied by storage units, displays, input/output devices, an operating system, database management software, networking software, and the like. Such systems are well known in the art, and need not be described in detail. Switch 102 may be configured as a general purpose computer, a network switch, or any other such network host. In a preferred embodiment, controller 102 is modeled on a network switch architecture but includes RF network controller software (or "module") whose capabilities include, among other things, the ability to allow configure and monitor readers 108 and antennas 106.

RF switch 110 allows multiple read points 116 to be logically combined, via controller 102, within a single read point zone (or simply "zone"). For example, referring to FIG. 1, a read point zone 120 may be defined by the logical union of read points 116(a), 116(b), and 116(c). Note that the read points need not overlap in physical space, and that disjoint read points (e.g., read point 116(d)) may also be included in the read point zone if desired. In a preferred embodiment, antennas (i.e., read points defined by the antennas) can be arbitrarily assigned to zones, regardless of whether they are associated with the same reader. That is, referring to FIG. 1, antennas 106(b) and 106(c), while both associated with reader 108(b), may be part of different zones. Controller 102 then receives all tag data from readers 108 via respective data links 103 (e.g., wired communication links, 802.11 connections, or the like), then aggregates and filters this data based on zone information. The read point zones are suitably pre-configured by a user or administrator. That is, the user is allowed to access controller 110 and, through a configuration mode, specify a set of read points that are to be included in a particular zone.

Figure 2:
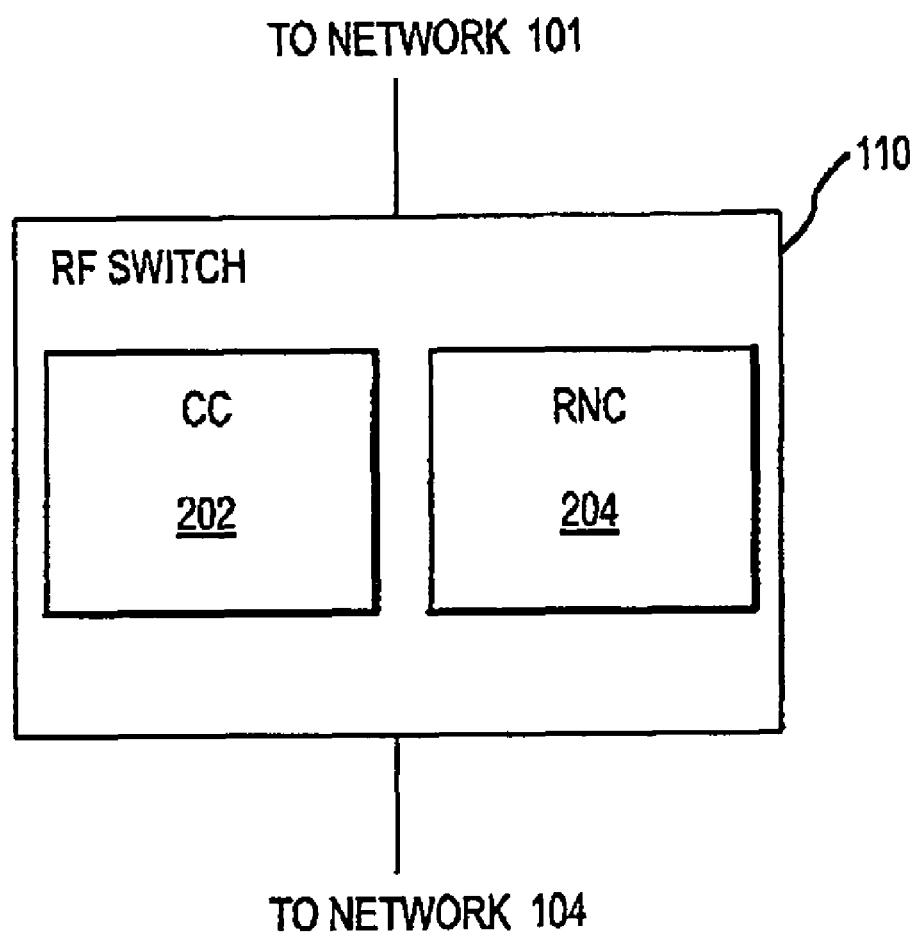
FIG. 2 is a conceptual overview of an exemplary RF switch in accordance with one embodiment.

FIG. 2 depicts a conceptual block diagram of an RF switch 110. A shown, switch 110 includes a cell controller (CC) 202, and a RFID network controller (RNC) 204. In general, RNC 204 includes hardware and software configured to handle RFID data communication and administration of the RFID network components, while CC 202 includes hardware and software configured to handle wireless data (e.g., in accordance with IEEE 802.11) from the mobile units and access ports within wireless cells. In one embodiment, RF switch 110 includes a single unit with an enclosure containing the various hardware and software components necessary to perform the various functions of CC 202 and RNC 204. Switch 110 also includes suitable input/output hardware interfaces to networks 101 and 104.

Figure 3:
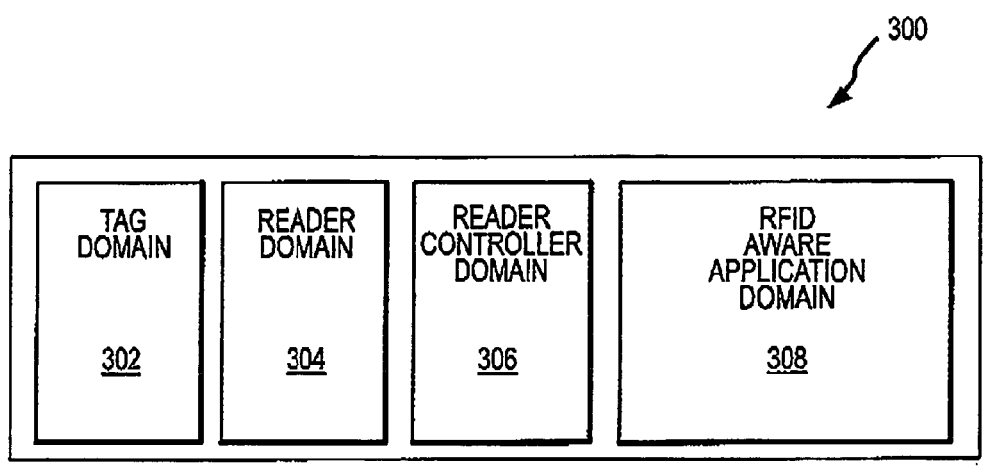
FIG. 3 depicts various functional domains of the present invention.

FIG. 3 illustrates, conceptually, the four major domains of an exemplary RF switch network—i.e., tag domain 302, reader domain 304, reader controller domain 306, and RFID-aware application domain 308.

Tag domain 302 comprises tags, tagged assets, and objects that require tracking and/or monitoring (e.g., tags 104 in FIG. 1). As mentioned previously, these tags may be active, passive, or a combination thereof.

Reader domain 304 includes, inter alia, physical antennas 106, readers 108, and APs 120. Objects in reader domain 304 acquire information from objects in tag domain 302 and pass associated data to reader controller domain 306.

Reader controller domain 306 comprises RNC objects. RNC objects (e.g., RNC 204 in FIG. 2) act as an integration point for RFID readers/antennae and include the functionality of filtering and aggregating volumes of data provided by readers 108, supporting the analysis of data and applying local decision making and intelligence. The RNC is preferably compatible with readers from multiple vendors and effectively hide individual reader and tag interface idiosyncrasies from RFID aware application domain 308.

RFID-aware application domain 308 includes one or more standalone applications and/or middleware applications that function as intermediaries between enterprise applications 105 and the RNC. In this regard, the applications within this domain rely on events on a higher level—i.e., events that are important in the context of a business operation or process.

Figure 4:
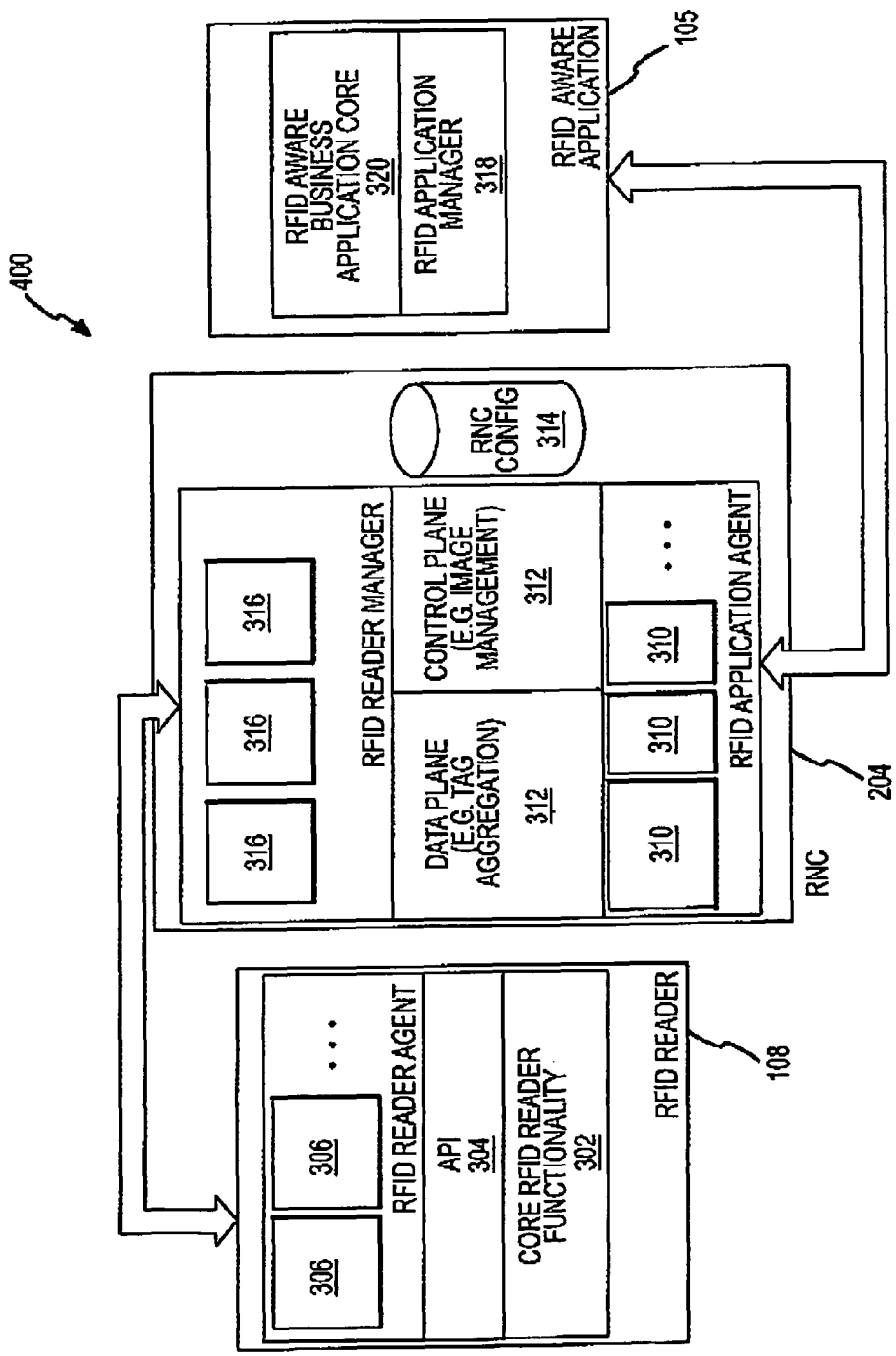
FIG. 4 depicts various components of an exemplary system in accordance with the present invention.

FIG. 4 is a block diagram showing the components of an exemplary system corresponding to the various domains illustrated in FIG. 3. As shown, system 400 generally includes an RFID reader 108, an RNC 204, and an application 105 communicating as shown.

Reader 108 includes one or more reader agents 306, an application programming interface (API) 304, and some core functionality 302. Reader 108, as mentioned above, is responsible for reading RFID tags (embodied within core functionality 302). For active tags read by an AP, switch 110 acts as an RFID reader and communicates the tag info to RNC 204. Reader agents 306 includes the interfaces through which RNC 204 communicates. This may include, for example, a proprietary interface, an SLRRP interface, other any other interface, such as dynamically-loadable modules for other protocols. In one embodiment, RFID reader 108 provides a C# API 304 for core RFID reader functionality 302, and reader agents 306 make use of this API.

Reader 108 implements a suitable RNC discovery procedure. In one embodiment, the reader first makes use of IP subnet broadcast. If no response is received, reader 108 refers to a list of statically configured RNCs 204 (which is preferably stored across reboots in the reader). If no response is received using this method, then reader 108 consults a discovered list of RNCE controllers (also stored across reboots in the reader). This list includes a list of RNCs 204 to which the reader had prior success in joining. If no response is received, Reader 108 uses a list of RNCs received in a DHCP offer (using option 43, known in the art).

RNC 204 includes one or more RFID reader managers 316, a data plane 312, a control plane 312, one or more RFID application agents 310, and a RNC configuration database 314. In one embodiment, RNC includes a set of processes, shared libraries, and the like running under Linux and a local operating system. RFID reader managers 316 communicates with RFID reader 108 using any suitable interface, such as a proprietary interface, SLRRP, or the like. RFID application agents 310 provide suitable interfaces, such as ALE, MQTT, JMS, SQL, IBM Premises Server Interface, or any other suitable interface. Applications 105 includes an RFID-aware business application core 320 and an RFID application manager 318.

In summary, what has been described is a centralized networking switching device that efficiently controls the routing of RFID data as well as WLAN data (e.g., 802.11 devices), and allows configuration and coordination of the various components of both systems. More broadly, the present invention is not so limited, and allows all manner of RF elements (RFID tags, 802.11 devices, and any other component that wirelessly communicates via RF) to be controlled and configured via a single network switch.

It should be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A consolidated Radio Frequency (RF) network system comprising:
    at least one enterprise application coupled to a network;
    a plurality of Radio Frequency Identification (RFID) readers coupled to the network and having one or more associated RFID antennae, the RFID readers configured to process tag information from RFID tags within range of the RFID antennae;
    a plurality of wireless access ports communicatively coupled to the network and having one or more associated access port antennae, the wireless access ports configured to process data packets received from a plurality of mobile units and data packets from active RFID tags within range of the access port antennae; and
    an RF switch communicatively coupled to the network and configured to receive the data packets from the access ports including the tag information from the RFID readers, wherein the RFID switch is configured to provide a discovery procedure to become communicatively coupled to network via a Radio Network Controller (RNC), wherein the procedure includes first using an Internet Protocol subnet broadcast, and if no response is received referring to a list of statically configured RNCs, and if no response is received consulting a list of previously discovered RNCs, and if no response is received using a list of RNCs received in a Dynamic Host Configuration Protocol (DHCP) offer, the RF switch configured to act as an RFID reader to provide tag information from data packets from active RFID tags, and to transmit the data packets from the mobile units and the tag information from the RFID readers and access ports to the at least one enterprise application, wherein the RF switch aggregates and filters the tag information based on zone information of the RFID readers and access ports, the zone information based on multiple read points logically combined.

2. The system of claim 1, wherein the RF switch includes an enclosure having input/output connectors for connecting to the access port and the RFID reader.

3. The system of claim 2, wherein the RF switch includes a cell controller configured to process the data packets, and a RFID network controller configured to process the tag information.

4. The system of claim 3, wherein the RFID network controller includes at least one RFID reader manager.

5. The system of claim 3, wherein the RFID network controller includes at least one RFID application agent.

6. The system of claim 3, wherein the RFID network controller includes a data plane configured to provide aggregation of the tag information.

7. The system of claim 3, wherein the RFID reader includes at least one RFID reader agent configured to communicate with the RFID reader manager.

8. A method of communicating with at least one application over a Radio Frequency (RF) network, the method comprising:
- configuring an RF switch to act as a Radio Frequency Identification (RFID) reader;
- discovering a Radio Network Controller (RNC) by the RF switch in order to become communicatively coupled to the RNC, wherein discovering includes first using an Internet Protocol subnet broadcast, and if no response is received referring to a list of statically configured RNCs, and if no response is received consulting a list of previously discovered RNCs, and if no response is received using a list of RNCs received in a Dynamic Host Configuration Protocol (DHCP) offer;
- receiving over the network, at the RF switch, data packets from an access port communicatively coupled to a plurality of mobile units and active RFID tags via a wireless network, wherein the RF switch is configured to act as an RFID reader to provide tag information from the data packets from the active RFID tags; and
- receiving over the network, at the RF switch, tag information from an RFID reader communicatively coupled to a plurality of RFID tags;
- aggregating and filtering the tag information from the RFID reader and provided by the RF switch itself from the access port data packets from the active RFID tags, at the RF switch, based on zone information of the RFID readers and access ports, the zone information based on multiple read points logically combined; and
- transmitting to the application at least one of the aggregated and filtered tag information from the RFID readers and access ports and the data packets from the mobile units.

* * * * *